P. A. GSTALDER.
VALVE.
APPLICATION FILED SEPT. 2, 1905.
951,392.
Patented Mar. 8, 1910.
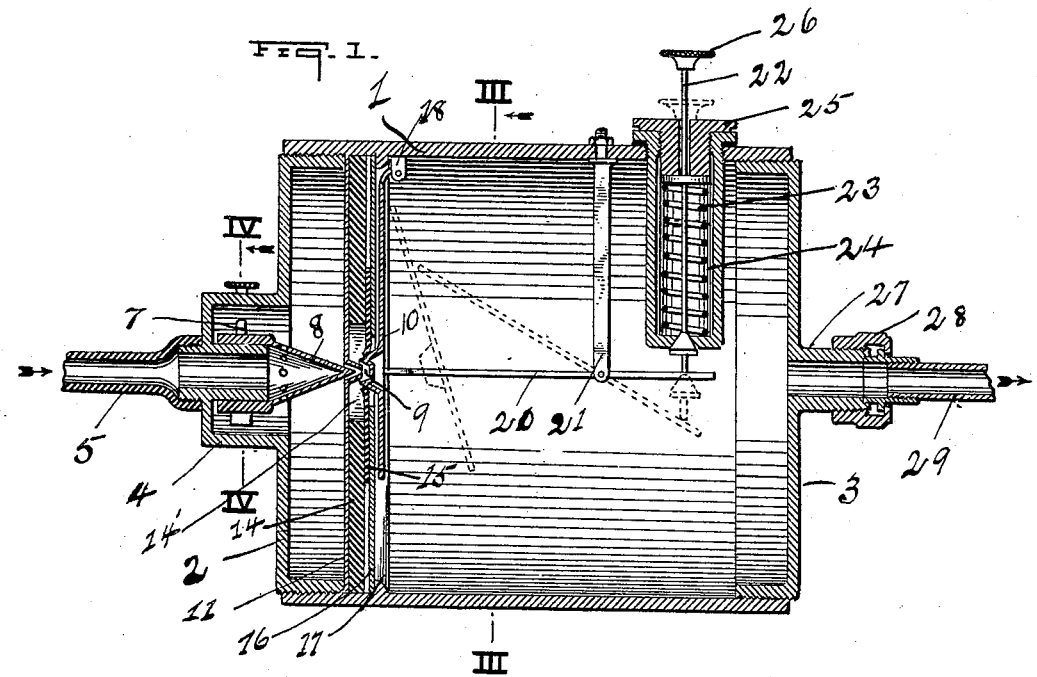
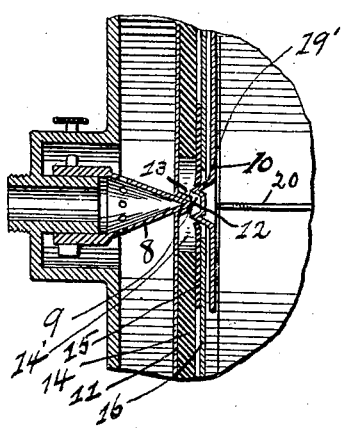
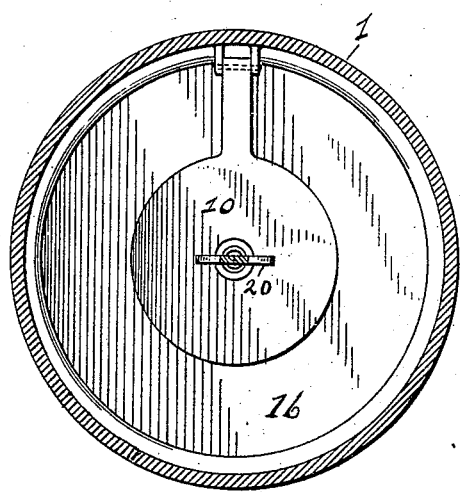
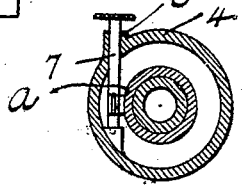
WITNESSES:
INVENTOR
Paul A. Gstalder
by John H. Roney
his ATTORNEY

UNITED STATES PATENT OFFICE.

PAUL A. GSTALDER, OF PITTSBURG, PENNSYLVANIA, ASSIGNOR OF ONE-HALF TO CHARLES P. BURKE, OF PITTSBURG, PENNSYLVANIA.

VALVE.

951,392.  Specification of Letters Patent.  Patented Mar. 8, 1910.

Application filed September 2, 1905. Serial No. 276,893.

*To all whom it may concern:*

Be it known that I, PAUL A. GSTALDER, a citizen of the United States, residing at Pittsburg, in the county of Allegheny and State of Pennsylvania, have invented a new and useful Improvement in Valves, of which improvement the following is a specification.

My invention relates to valves, and particularly to valves for use of gas.

The object of my invention is to produce a valve which will automatically close when the gas is shut off accidentally or otherwise, or upon an excessive decrease in the gas pressure, or in the event of the combustion of the gas being accidently or otherwise extinguished at the burner, causing abnormal back pressure on the valve, and which will remain closed until it is manually restored to its open condition. I accomplish this object by means of the device hereinafter more specifically described, reference being had to the accompanying drawings, forming part hereof, in which—

Figure 1 indicates an enlarged central longitudinal section of my improved valve. Fig. 2 is a section through the valve and diaphragm showing the valve in closed position. Fig. 3 is a sectional elevation on the line III—III of Fig. 1. Fig. 4 is a section on the line IV—IV of Fig. 1. Fig. 5 is a plan view of the lock bar.

Referring to said drawing, 1 is a shell of any suitable construction, being provided with heads 2—3 which close the ends thereof. The head 2 is provided with a boss 4, the end of which is screw threaded to receive a correspondingly threaded supply pipe or tube 5. An orifice 6 is formed in the upper wall of said boss in which the adjusting screw 7 is seated, the said screw projecting into the interior of said boss and engages the threaded portion *a* of the nozzle 8 for the purpose of moving the said nozzle toward and from the orifice 9 which is adapted to be closed by the fly or flap valve 10. The said head 2 is screw threaded and the inner end engages or impinges upon the disk diaphragm 11, which is provided with a small opening 12 in which the needle like end of the nozzle 8 projects, the said orifice having an inwardly projecting flange 13 corresponding in shape to the end of said nozzle. A heavy rubber washer 14 is interposed between said disk or diaphragm 11 and a thin rubber diaphragm or washer 15, which is provided with an opening 9. A metal washer 16, which is provided with a central orifice, is interposed between said thin rubber washer 15 and the rim of the annular projection 17, for the purpose of giving support or rigidity to the washer 15 at a point above the orifice 14' in the heavy washer 14. To the rear of said annular projection 17 a lug 18 is located, to which the fly or flap valve 10 is pivotally hung, the outwardly projecting center portion 19' of which is adapted to enter the orifice in the washer 15 when said valve is closed, the pressure of the gas upon the thin washer around the edges of the orifice therein causes the washer to cling or fit tightly against the projecting portion 19' of the fly-valve, and thus prevent the gas from passing through the said orifice or between the washers.

A lock bar 20, pivotally secured to the lower end of the rod 21, which is secured in the upper wall of the shell, serves to hold the valve closed, the said bar projects some distance beyond the point at which it is pivoted to said rod and is engaged by rod 22 on which is mounted the spiral spring 23, located in the chamber 24, which is suitably secured in said shell, the outer end being closed gas tight by the cap 25. The rod 22 extends through said cap and terminates in a push button 26, whereby the said rod 22 may be pushed inward to release the valve. The discharge end, 27, of said valve shell is provided with a coupling 28, which may be of any suitable construction to enable said shell to be connected to the gas discharge pipe 29. The lock bar 20 is so balanced that any condition that varies the pressure upon the valve, as, for instance, a complete stoppage of the gas or the reduction of the pressure thereof, causes it to drop and hold the valve closed.

The advantages of my device are, first, its use enables the saving of gas; it automatically closes in the event of the gas being stopped, accidentally or otherwise, or in the event of the variation of the pressure, and remains closed until opened manually.

I claim as my invention and desire to secure by Letters Patent:

1. A valve comprising a shell having at one end a gas supply and at the opposite end a gas discharge opening, a disk having an opening therethrough, a flexible diaphragm extending across the said shell adjacent to said disk having an opening therethrough, and a fly valve adapted to close the opening in said diaphragm, the gas pressure in front of said flexible diaphragm forcing the same around the edges of said opening into gas tight contact with said valve.

2. A valve comprising a shell having at one end a gas supply and at its opposite end a gas discharge opening, a diaphragm extending across the said shell adjacent to said disk and having an opening therethrough, and a fly valve adapted to close said opening, a nozzle for the discharge of gas adapted to be adjusted from and toward the opening in said diaphragm.

3. A valve for gas comprising a shell having at one end a gas supply and at the opposite end a gas discharge opening, a flexible washer or diaphragm having an opening therethrough, means to support said washer or diaphragm within said shell, and a fly valve having a projection adapted to enter said orifice when said valve is closed, the said valve being adapted to be held open when the pressure is constant and normal and to close upon the diminution or stoppage, or upon back pressure on the valve occasioned by extinguishing the flame.

4. A valve for gas comprising a shell, a flexible diaphragm located therein having an opening, a fly valve, a lock bar balanced to supplement the weight of the valve to close said valve upon a stoppage or excessive reduction of gas pressure, a nozzle adapted to be adjusted with reference to the opening in said diaphragm and means to open said valve.

In testimony whereof, I have hereunto signed my name in the presence of two subscribing witnesses.

PAUL A. GSTALDER.

In the presence of—
  CLARENCE A. WILLIAMS,
  JOHN H. RONEY.